Patented Nov. 24, 1931

1,833,276

UNITED STATES PATENT OFFICE

WERNER BUSCH, OF COLOGNE-DEUTZ, GERMANY, ASSIGNOR TO I. G. FARBENINDUSTRIE AKTIENGESELLSCHAFT, OF FRANKFORT-ON-THE-MAIN, GERMANY, A CORPORATION OF GERMANY

RECOVERY OF COPPER FROM WASTE COPPER LYES

No Drawing. Application filed April 8, 1929, Serial No. 353,659, and in Germany April 25, 1928.

This invention relates to a process of recovering copper from ammoniacal waste copper lyes.

In the manufacture of artificial silk from copper oxide ammonia solutions of cellulose, a weakly ammoniacal copper solution is obtained by precipitating the cellulose from the spinning mass with water, said copper solution containing about 0,01% of copper and about 0,05 to about 0,01% of ammonia. In view of the small concentration of the copper, heretofore separation was very cumbersome. The copper can be recovered by precipitation with caustic soda or by cementation, but as the copper containing liquids are available in large quantities, the working up of the liquids requires large apparatus, or otherwise the liquids must be evaporated before the cementation or precipitation of the copper.

According to the present invention, the copper is recovered from the aforesaid copper-containing liquids by treating the solutions with an inert activated substance, such as activated carbon, activated silica gel, or fuller's earth for a prolonged time, say about ½ to about 2 hours. From the active substances the copper can be separated by treating the absorbents with a diluted or concentrated acid, such as sulfuric acid or nitric acid. From this it follows, that the absorbents used must be stable towards acids. The process may be carried out at any temperature below the boiling point of the copper containing liquid, and the quantity of the inert activated substance used may be varied within the widest limits. Generally I use for each gram of copper present in the liquid at least about 10 to about 20 grams of the absorbent. The process can be carried out by adding the required quantity of active substance to the copper containing liquid and thoroughly stirring the same for about ½ to about 2 hours and then separating the absorbent by filtering; or otherwise the copper containing liquid may be directly filtered through a layer of an inert activated substance, in which case care must be taken that the liquid to be filtered is in contact with the absorbent for about 1 to 2 hours; both methods of carrying out the process are equivalents.

The absorbent used in the invention may be, after removing the acid by washing with water, used again.

The invention is illustrated by the following example, but is not restricted thereto:

*Example.*—100 liters of an aqueous liquid containing about 0,01% of copper and 0,05% of ammonia, and being obtained in the manufacture of artificial silk from copper oxide ammonia cellulose by precipitating the cellulose with water, are mixed with about 80 grams of activated silica gel and thoroughly stirred for about ½ to about 1 hour at a temperature of about 20° C., then the colorless solution is filtered. From the residue obtained by filtering, the copper is dissolved by the addition of a 10% sulfuric acid of 20° C.

Instead of stirring the liquid with the activated silica gel, it may be directly filtered slowly through a layer of the silica gel.

I claim:

1. The process which comprises adding to a weakly ammoniacal aqueous liquid containing small quantities of copper an acid-proof inert absorbent, stirring the mixture for about ½ to 2 hours, filtering the same and treating the residue on the filter with a mineral acid.

2. The process which comprises adding to a weakly ammoniacal aqueous liquid containing small quantities of copper an inert absorbent of the group comprising activated silica gel, activated carbon and fuller's earth, stirring the mixture for about ½ to 2 hours, filtering the same and treating the residue on the filter with a mineral acid.

3. The process which comprises adding to a weakly ammoniacal aqueous liquid containing about 0,01% of copper an acid-proof inert absorbent, stirring the mixture for about ½ to 2 hours, filtering the same and treating the residue on the filter with a mineral acid.

4. The process which comprises adding to a weakly ammoniacal aqueous liquid containing about 0,01% of copper an inert absorbent of the group comprising activated silica gel, activated carbon and fuller's earth stirring the mixture for about ½ to 2 hours, filtering the same and treating the residue on the filter with a mineral acid.

5. The process which comprises adding to a weakly ammoniacal aqueous liquid containing small quantities of copper an inert acid-proof absorbent in a quantity of 10 to 20 times of the quantity of the copper present in the liquid, stirring the mixture for about ½ to 2 hours, filtering the same and treating the residue on the filter with a mineral acid.

6. The process which comprises adding to a weakly ammoniacal aqueous liquid containing small quantities of copper an inert absorbent of the group comprising activated silica gel, activated carbon and fuller's earth in a quantity of 10 to 20 times of the quantity of the copper present in the liquid, stirring the mixture for about ½ to 2 hours, filtering the same and treating the residue on the filter with a mineral acid.

7. The process which comprises adding to an aqueous liquid containing about 0,01% of copper and 0,05 to 0,1% of ammonia an acid-proof inert absorbent in a quantity of 10 to 20 times of the quantity of the copper present in the liquid, stirring the mixture for about ½ to 2 hours, filtering the same and treating the residue on the filter with a mineral acid.

8. The process which comprises adding to an aqueous liquid containing about 0,01% of copper and 0,05 to 0,1% of ammonia an inert absorbent of the group comprising activated silica gel, activated carbon and fuller's earth in a quantity of 10 to 20 times of the quantity of the copper present in the liquid, stirring the mixture for about ½ to 2 hours, filtering the same and treating the residue on the filter with a mineral acid.

9. The process which comprises adding to 100 liter of an aqueous liquid containing about 0,01% of copper and 0,05% of ammonia, 80 grams of activated silica gel, thoroughly stirring the mixture for about ½ to about 1 hour, filtering the same and treating the residue on the filter with a 10% sulfuric acid.

In testimony whereof I have hereunto set my hand.

WERNER BUSCH. [L. S.]